United States Patent Office 3,787,354
Patented Jan. 22, 1974

3,787,354
STABILIZATION OF SOLID POLYMERS WITH A BIS-(N,N-DIHYDROCARBYL-AMINOALKYL) ETHER
Henryk A. Cyba, Evanston, Ill., assignor to Universal Oil Products Company, Des Plaines, Ill.
No Drawing. Original application July 15, 1970, Ser. No. 55,262, now abandoned. Divided and this application Feb. 16, 1972, Ser. No. 226,979
Int. Cl. C08g 51/60
U.S. Cl. 260—45.9 R                10 Claims

ABSTRACT OF THE DISCLOSURE

Stabilization of organic substances against deterioration due to UV light, oxidation, heat, etc., by incorporating therein a bis-(N,N-dihydrocarbyl-amino-alkyl) ether in which the hydrocarbyl is sec-alkyl of from 3 to about 20 carbon atoms or cycloalkyl having 4 to about 12 carbon atoms in the ring. In one embodiment the compounds are used as weathering stabilizers for plastics.

CROSS-REFERENCE TO RELATED APPLICATION

This is a division of copending application Ser. No. 55,262, filed July 15, 1970, now abandoned.

DESCRIPTION OF THE INVENTION

This invention relates to the stabilization of organic substances against deterioration due to UV (utraviolet) light, oxidation, heat, etc., and particularly substances normally exposed to weathering. This stabilization is accomplished by incorporating therein a bis-(N,N-dihydrocarbyl-aminoalkyl) ether.

The bis-(N,N-dihydrocarbyl-aminoalkyl) ethers are illustrated by the following general formula:

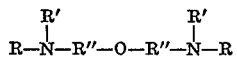

where R and R' are sec-alkyl of from 3 to about 20 carbon atoms or cycloalkyl having 4 to about 12 carbon atoms is the ring and R'' is alkylene of from 2 to about 6 carbon atoms. When R'' contains two or more carbon atoms, the alkylene group may be of straight or branched chain configuration.

In one embodiment R and R' are cycloalkyl and particularly cyclohexyl. Illustrative compounds in this embodiment include 2-(dicyclohexylamino) ethyl ether, 2-(dicyclohexylamino) propyl ether, 3-(dicyclohexylamino) propyl ether, 2-(dicyclohexylamino) butyl ether, 3-(dicyclohexylamino) butyl ether, 4-(dicyclohexylamino) butyl ether, 2-(dicyclohexylamino) pentyl ether, 3-(dicyclohexylamino) pentyl ether, 4-(dicyclohexylamino) pentyl ether, 5-(dicyclohexylamino) pentyl ether, 2-(dicyclohexylamino) hexyl ether, 3-(dicyclohexylamino) hexyl ether, 4-(dicyclohexylamino) hexyl ether, 5-(dicyclohexylamino) hexyl ether and 6-(dicyclohexylamino) hexyl ether. In place of the dicyclohexyl derivatives, the corresponding dicyclobutyl, dicyclopentyl, dicycloheptyl, dicyclooctyl, dicyclononyl, dicyclodecyl, dicycloundecyl and dicyclododecyl derivatives are comprised in the present invention.

In another embodiment R and R' are sec-alkyl of from 3 to about 20 carbon atoms. Illustrative compounds in this embodiment include 2-(diisopropylamino) ethyl ether, 2-(diisopropylamino) propyl ether, 3-(diisopropylamino) propyl ether, 2-(diisopropylamino) butyl ether, 3-(diisopropylamino) butyl ether, 4-(diisopropylamino) butyl ether, 2-(diisopropylamino) pentyl ether, 3-(diisopropylamino) pentyl ether, 4-(diisopropylamino) pentyl ether, 5-(diisopropylamino) pentyl ether, 2-(diisopropylamino) hexyl ether, 3-(diisopropylamino) hexyl ether, 4-(diisopropylamino) hexyl ether, 5-(diisopropylamino) hexyl ether, and 6-(diisopropylamino) hexyl ether.

In place of the diisopropyl derivatives, the corresponding di-secbutyl, di-secpentyl, di-sechexyl, di-secheptyl, di-secoctyl, di-secnonyl, di-secdecyl, di-secundecyl, di-secdodecyl, di-sectridecyl, di-sectetradecyl, di-secpentadecyl, di-sechexadecyl, di-secheptadecyl, di-secoctadecyl, di-secnonadecyl and di-seceicosyl derivatives are comprised in the present invention.

The compounds for use in the present invention are prepared in any suitable manner. In one method the dihydrocarbyl-alkanolamine is first prepared and then is converted to the corresponding ether in any suitable manner. The dihydrocarbyl-alkanolamine is prepared, for example, by the reductive alkylation of the alkanolamine with a suitable ketone as, for example, acetone, cyclohexanone, etc. The reductive alkylation is well known and generally is effected in the presence of a Group VIII metal catalyst, and particularly platinum, at a temperature of from about 90° to about 250° C. under a hydrogen of about 50 to 2000 pounds per square inch or more. The resultant dihydrocarbylamine is then subjected to oxyalkylenation to form the corresponding dihydrocarbyl-alkanolamine. The oxyalkylenation is well known and generally is effected by reacting with an alkylene oxide as, for example, ethylene oxide, in substantially equal molar proportions at a temperature of from about 50° to about 250° C. and a pressure of from about 10 to 1000 pounds or more. Generally a condensation type catalyst is required, although, when desired, higher temperatures may be used in lieu of catalyst but not necessarily with the same results. As will be hereinafter described in detail, 2-dicyclohexylamino ethyl ether was prepared by the oxyethylation of dicyclohexylamine to form N,N-dicyclohexyl-ethanolamine, which then was converted to the ether by heating under conditions to liberate water. Corresponding compounds may be prepared in a similar manner when starting with the desired N,N-dihydrocarbyl-alkanolamine.

In still another method, di-(2-chloroethyl) ether is reacted with the desired amine, such as dicyclohexylamine or diisopropylamine, disecbutylamine, disecoctylamine, etc., and hydrochloric acid liberating conditions in the presence of a base such as sodium carbonate or preferably trimethyl or triethylamine in highly polar solvent.

The additives of the present invention will have varied utility. They are of especial utility as additives in substrates exposed to weather and, in this embodiment, the compounds of the present invention serve as weather stabilizers and thus serve to retard deterioration due to ultraviolet light, oxidation, heat, etc. The substrates normally exposed to weathering which, in one embodiment, are described as solid polymers and include plastics, resins, fibers, etc.

Illustrative plastics which are stabilized in accordance with the present invention include polyolefins and particularly polyethylene, polypropylene, polybutylene, mixed ethylene propylene polymers, mixed ethylene butylene polymers, mixed propylene butylene polymers, mixed styrene propylene polymers, etc. The solid olefin polymers are used in many applications including electrical insulation, lightweight outdoor furniture, awnings, cover for greenhouses, etc.

In another embodiment, the polymers to be stabilized include those prepared from diolefinic monomers as, for example, polybutadiene, or those in which the diolefin or diolefins are reacted with monoolefin or monoolefins, including, for example, ABS (acrylonitrile-butadiene-styrene polymers).

Another plastic being used commercially on a large scale which is treated in the present invention is polystyrene. The polystyrenes are particularly useful in the manufacture of molded or machined articles which find application in such goods as windows, optical goods, automobile panels, molded household articles, etc.

Another class of plastics available commercially and which are treated in the present invention is broadly classed as vinyl resin and is derived from monomers such as vinylchloride, vinylacetate, vinylbutyrate, etc. Other vinyl type resins which are stabilized in accordance with the present invention include polyvinylalcohol and copolymers, copolymers of vinyl chloride with acrylonitrile, methacrylonitrile, alkylacrylates, alkyl methacrylates, alkyl maleates, alkylfumarates, polyvinylbutyral, etc., or mixtures thereof.

Other plastics being used commercially on a large scale which are stabilized according to the present invention are in the textile class and include nylon (polyamide), Perlon L or 6-nylon (polyamide), dacron (terephthalic acid and ethylene glycol), orlon (polyacrylonitrile), dynel (copolymer of acrylonitrile and vinyl chloride), acrilan (polyacrylonitrile modified with vinyl acetate), rayon, etc.

Still other plastics which are stabilized by the present invention are prepared from other monomers and are available commercially. Illustrative examples of such other solid polymers include polycarbonates, polyphenyl oxides (polyphenyl ethers), phenol-formaldehyde resins, acryloid plastics which are derived from methyl, ethyl and higher alkyl acrylates and methacrylates as monomers used in the polymerization. Other polymers for stabilization in the present invention include polyacetals, especially polyformaldehydes such as "Delrin" and "Celcon." Still other substrates include vinyl, acrylic, cellulose acetate butyrate, ethyl cellulose, etc. Still other substrates for stabilization in the present invention are polyesters, laminate polyesters, etc., polyurethanes, epoxy resins, various latexes, lacquers, alkyds, varnishes, polishes, stains, pigments, dyes, textile finishing formulations, cosmetics such as creams, lotions, sprays, etc.

It is understood that the plastic or resin may be fabricated into any desired finished product including moldings, castings, fibers, films, sheets, rods, tubing, foams or other shapes.

Another solid polymer which undergoes deterioration due to oxidation and/or weathering is rubber, and the same is stabilized in accordance with the present invention. Rubber is composed of polymers of conjugated 1,3-dienes, either as polymers thereof or as copolymers thereof with other polymerizable compounds, and may be described as rubbery polymer of conjugated 1,3-diene, and may be synthetically prepared or of natural origin. Synthetic rubbers include SBR rubber, (copolymer of butadiene and styrene), EPR rubber also named EPDM rubber, (terpolymer of ethylene, propylene and a diene), Buna A (copolymer of butadiene and acrylonitrile), butyl rubber (copolymer of butadiene and isobutylene), Thiokol rubber (polysulfide), silicone rubber, etc. Natural rubbers include hevea rubber, cautchouc, balata, gutta percha, etc.

Still other organic substrates which undergo deterioration due to oxidation and/or weathering include paints, varnishes, drying oil, pigments, rust preventative coatings, other protective coatings, etc. These substrates also are stabilized in accordance with the present invention. While the compounds of the present invention are especially useful in materials subject to weather, it is understood that the compounds of the present invention also may be used advantageously in other polymers, coatings, paints, etc. which normally are not exposed outdoors.

In addition to serving as a stabilizer of solid polymers, the compounds of the present invention also may serve as curing agents in plastics, resins or the like which undergo curing as one step in the preparation thereof. In still another embodiment the compounds of the present invention also may serve as dye sites in plastics and in still another embodiment these compounds may serve as plasticizers.

The compounds of the present invention also are of utility as additives in other organic substrates including, for example, hydrocarbon distillates. Illustrative hydrocarbon distillates include gasoline, naphtha, kerosene, jet fuel, solvents, fuel oil, burner oil, range oil, diesel oil, marine oil, turbine oil, cutting oil, rolling oil, soluble oil, drawing oil, slushing oil, lubricating oil, fingerprint remover, wax, fat, grease, etc. In addition to hydrocarbon oils, the compounds of the present invention also may be used in synthetically prepared oils and particularly synthetic lubricating oils including aliphatic esters as, for example, dioctyl sebacate; polyalkylene oxides; neopentyl glycol esters; trimethylol alkanes; triaryl phosphates, trialkyl phosphates and aryl-alkyl phosphates, etc. In the oils, the compounds of the present invention serve to inhibit oxidative deterioration, thermal deterioration, etc., thereby retarding and/or preventing sediment formation, dispersion of sediment when formed, preventing and/or retarding discoloration, rust or corrosion inhibitor, detergent, etc. In gasoline, the additive improves the combustion characteristics of the gasoline.

In many applications it is advantageous to utilize the compounds of the present invention in conjunction with other additives. For example, particularly improved results are obtained in the stabilization of plastics, apparently due to a synergistic effect, when the compound of the present invention is used in admixture with a phenolic antioxidant including particularly 2,6-ditertiary-butyl-4-methylphenol. Other inhibitors which may be used generally will be of the phenolic or amine type and include phenyl-alpha-naphthylamine, phenyl-beta-naphthylamine, phenothiazine, Nonox WSP, Nonox Cl, dialkylated phenols, trialkylated phenols including 2,4-dimethyl-6-tertiarybutylphenol, etc., Santonox R, Santowhite, alkyl-alkoxyphenols, 2246 (2,2'-methylene-bis-(4-methyl-6-tert-butylphenol), and
(2,2'-methylene-bis-(4-ethyl-6-tert-butylphenol),
diphenyl-p-phenylenediamine,
1,1,3-tris-(2-methyl-4-hydroxy-5-t-butylphenyl) butane,
703 (2,6-di-tert-butyl-alpha-dimethylamino-p-cresol),
4,4'-bis-(2-methyl-6-tert-butylphenol);
4,4'-thio-bis-(6-tert-butyl-o-cresol);
4,4'-bis-(2,6-di-tert-butylphenol);
4,4'-methylene-bis-(2,6-di-tert-butylphenol);
Salol (salicylic acid esters),
p-octyl-phenylsalicylate,
various phosgene alkylated phenol reaction products,
various alkoxyalkyldihydroxybenzophenones,
polyalkyldihydroxybenzophenones,
tetrahydroxybenzophenones,
2,4,5-trihydroxybutyrophenone, etc., and especially such hydroxybenzophenones as 2,2'-dihydroxy-4-octoxybenzophenone,
2,2'-dihydroxy-4-decoxybenzophenone,
2,2'-dihydroxy-4-dodecoxybenzophenone,
2,2'-dihydroxy-4-octadecoxybenzophenone, etc., in general any alkoxy or cycloalkoxy substituted 2,2'-dihydroxybenzophenone,
2-hydroxy-4'-octoxybenzophenone,
2-hydroxy-4'-decoxybenzophenone,
2-hydroxy-4'-dodecoxybenzophenone, etc., and in general any alkoxy or cycloalkoxy substituted 2-hydroxybenzophenones.

Other ultraviolet light stabilizers include nickel-bis-dithiocarbamates and especially nickel-bis-dibutyldithiocarbamate,
nickel-bis-dihydroxypolyalkylphenol sulfides,
especially [2,2'-thiobis-(4-t-octylphenolato)]-n-butylamine nickel (II),
dilauryl beta-mercaptopropionate, dihydroxytetralkyl sulfides,
dihydroxytetralkyl methanes,
various trialkylthiophosphites as trilaurylthiophosphite,
dialkylphosphites,
trialkylphosphites or their polymeric derivatives such
   as polymeric phosphites or phosphonates,
high molecular weight nitriles,
various Mannich bases,
various N-hydroxyphenylbenzotriazoles,
such as 2-(2'-hydroxy-5'-octylphenyl)-benzotriazole,
2-(2'-hydroxy-5'-dodecylphenyl)-benzotriazole,
2-(2'-hydroxy-5'-octoxyphenyl)-benzotriazole,
2-(2'-hydroxy-5'-dodecoxyphenyl)-benzotriazole,
Tinuvin 326, etc., in general, any alkyl or alkoxyphenyl substituted benzotriazole, etc. The additional additive may be used in a concentration of from about 1% to about 75% by weight of the compound of the present invention. Generally, the additional additive will be used in a concentration within the range of from about 0.001% to about 3% and more particularly from about 0.01% to about 2% by weight of the substrate. When used in gasoline, kerosene, diesel fuel or fuel oil, the additional additive may comprise a metal deactivator as, for example, disalicylal diaminopropane, ethylene diamine tetraacetic acid, etc., dyes, detergents, surface active agents, antiknock agents, cetane improvers, etc. As specifically required, such additional additives are used in conventional concentrations.

The additive of the present invention will be used in a stabilizing concentration which will depend upon the particular substrate. The additive may be used in a concentration as low as 0.0001% to as high as about 5% but generally will be used in a concentration of from about 0.01% to about 2% by weight of the substrate. When used in hydrocarbon distillate and particularly gasoline, kerosene, diesel fuel or fuel oil, the additive generally is used in a concentration of from about 0.0001% to about 0.5%. The additive is incorporated in the substrate in any suitable manner. For example, when it is incorporated into a plastic, resin or the like, it may be added to the hot melt, generally in a Banbury mixer, extruder or other device. When it is added to a liquid, it is incorporated into the liquid with intimate stirring. When it is added to a multicomponent mixture as, for example, grease, it may be added to one of the components and, in this manner, incorporated into the final mix or it may be added directly into the final mix.

In another embodiment the additive of the present invention serves as a biocide and, in this embodiment, will be used in very low concentrations which may range from 10 to 200 parts per million of the substrate.

The additive of the present invention may be utilized as such or prepared as a solution in a suitable solvent including alcohols and particularly methol, ethanol, propanol, butanol, etc., hydrocarbons and particularly benzene, toluene, xylene, cumene, Decalin, etc.

The following examples are introduced to illustrate further the novelty and utility of the present invention but not with the intention of unduly limiting the same.

EXAMPLE I

This example describes the preparation of 2-dicyclohexyl-aminoethyl ether and was prepared by first reacting dicyclohexylamine with ethylene oxide. Specifically, 1818 g. (10 mole) of dicyclohexylamine and 440 g. of ethylene oxide in 100 cc. of isopropanol were reacted at a temperature of about 170° C. and a pressure of about 70 p.s.i.g. The reaction was effected in a sealed 2-gallon autoclave equipped with a stirring blade. Following completion of the reaction, the reaction mixture was subjected to high temperature distillation at a temperature of about 200° C. under a pressure of 1–2.5 mm. The bottoms of the distillation were recovered and analyzed by NMR and infrared, as well as for carbon, hydrogen and nitrogen. The analysis confirmed the structure of the dicyclohexyl-aminoethyl ether. The carbon found was 77.17% which corresponds to the theoretical of 77.71%. The hydrogen found was 11.88% and the theoretical hydrogen is 12.11%. The nitrogen found was 6.29% which corresponds to the theoretical of 6.47%.

EXAMPLE II

Di-isopropyl amine is subjected to oxyethylation in substantially the same manner as described in Example I and the resultant di-isopropyl-ethanolamine is subjected to high temperature distillation under vacuum. The bottoms from the distillation comprise 2-di-isopropyl-aminoethyl ether.

EXAMPLE III

Di-sec-butylamine is subjected to oxypropylenation with propylene oxide in substantially the same manner as described in Example I. The reaction product is subjected to high temperature distillation under vacuum and the bottoms comprise 3-di-sec-butyl-aminopropyl ether.

EXAMPLE IV

As hereinbefore set forth, the products of the present invention are particularly useful as additives to prevent deterioration of plastic due to weathering. The present example reports the results of evaluations made in a commercial solid polypropylene which was free of additives.

Samples of the polypropylene, with and without additives, were pressed into sheets, and dumbbell specimens were cut from the sheets. The specimens were thin tensiles of 5–7 mil thickness. As is well known, these thin tensiles are more difficult to stabilize than the thicker tensiles used in other evaluations. The dumbbell specimens were mounted on boards and exposed to carbon arc rays at about 52° C. in a Fade-O-Meter. The specimens were withdrawn periodically, removed from the board and the yield value determined in an Instron Universal tester. In an Instron Universal tester the specimen is gripped firmly at the top and bottom. A constant pull of 2 inches per minute is exerted downwardly and the point at which the sample loses its resistance to permanent deformation is defined as the yield value. In most cases, the yield value is equivalent to the tensile strength, which is the pounds per square inch force at which rupture occurs.

A control sample of the polypropylene (not containing the additive) had an initial yield strength of 4480 p.s.i. which dropped to 1260 p.s.i. after 72 hours and was brittle after 96 hours of exposure in the Fade-O-Meter.

Another sample of the polypropylene was prepared to contain 0.25% by weight of 2-(di-cyclohexylamino) ethyl ether prepared as described in Example I. This sample had an initial yield value of 4700 p.s.i. which decreased to only 3660 p.s.i. after 600 hours of exposure in the Fade-O-Meter. It will be noted that this additive was very effective in retarding deterioration of the polypropylene.

EXAMPLE V

The plastic of this example is solid polyethylene of the high density type. An inhibited product of this polyethylene is marketed commercially under the trade name of Fortiflex. A batch of this polyethylene free of inhibitor is pressed into sheets of about 20 mil of thickness and cut into plaques of about 1⅜" by 1½". When employed, the additive is incorporated in the polyethylene prior to pressing into sheets. The different samples are evaluated in the Fade-O-Meter. The plaques are inserted into plastic holders, affixed onto a rotating drum and exposed to carbon arc rays at about 52° C. in the Fade-O-Meter. The samples are examined periodically by infrared to determine the carbonyl band at 1715 cm.$^{-1}$, which is reported as the carbonyl number. The higher intensity of the carbonyl band indicates a higher carbonyl concentration (expressed as carbonyl number) and accordingly increased deterioration.

The sample of the polyethylene without inhibitor, when evaluated in the above manner, increases from a carbonyl number of 28 to a carbonyl number of 855 within 624 hours. In contrast, another sample of the polyethylene containing 0.5% by weight of 2-di-isopropyl-aminoethyl ether, prepared as described in Example II, does not develop a carbonyl number of 1000 for a considerably longer period of time.

EXAMPLE VI

In this example, 3-di-sec-butyl-aminopropyl ether, prepared as described in Example III, is used as an additive in polystyrene. The additive is incorporated in a total concentration of 0.75% by weight by partly melting the polystyrene and incorporating the additive into the hot melt. The polystyrene containing the additive is of improved resistance to deterioration by oxidation and ultraviolet light.

EXAMPLE VII

In this example, 2-(di-cyclohexylamino) ethyl ether, prepared as described in Example I, is utilized as an additive in polyvinyl chloride plastic. Here again, the additive is incorporated by partly melting the polyvinyl chloride and adding the additive to the hot melt in a concentration of 0.6% by weight. This serves to inhibit deterioration of the polyvinyl chloride plastic due to U.V. light absorption and oxidation.

EXAMPLE VIII

In this example, 2-(di-cyclohexylamino) ethyl ether, prepared as described in Example I, is utilized as an additive in fuel oil. The additive is used in a concentration of 0.005% by weight and serves to retard sediment formation and discoloration of the fuel oil during storage and transportation.

EXAMPLE IX

The 2-(di-cyclohexylamino) ethyl ether, prepared as described in Example I, is utilized as a catalyst for curing polyurethane. The polyurethane prepolymer is prepared by reacting toluene-2,4-diisocyanate and anhydrous polytetramethyleneether glycol. The 2-di-cyclohexylaminoethyl ether and prepolymer, in a proportion of about 9 parts per 100 parts of the prepolymer, are mixed at room temperature and stirred for about 1 minute while heating slightly. The mixture is poured into a slab rubber mold and cured for about 3 hours at 100° C.

I claim as my invention:

1. A solid polymer stabilized against deterioration due to at least one of ultraviolet light, oxidation and heat containing a stabilizing concentration of a bis-(N,N-di-hydrocarbyl-aminoalkyl) ether of the following general formula:

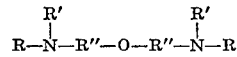

where R and R' are sec-alkyl of from 3 to about 20 carbon atoms or cycloalkyl having 4 to about 12 carbon atoms in the ring and R" is alkylene of from 2 to about 6 carbon atoms.

2. The solid polymer of claim 1 being a polyolefin.
3. The solid polymer of claim 2 being polypropylene.
4. The solid polymer of claim 2 being polyethylene.
5. The solid polymer of claim 2 being polystyrene.
6. The solid polymer of claim 1 being polyvinyl chloride.
7. The solid polymer of claim 1 being 1,3-diene rubber.
8. The solid polymer of claim 1 in which said ether is a bis-(N,N-di-cyclohexyl-aminoalkyl) ether.
9. The solid polymer of claim 8 in which said ether is 2-(di-cyclohexylamino) ethyl ether.
10. The solid polymer of claim 1 in which said ether is a bis-(N,N-di-sec-alkyl-aminoalkyl) ether.

References Cited
UNITED STATES PATENTS

| | | | |
|---|---|---|---|
| 2,716,134 | 8/1955 | Reynolds et al. | 260—563 R |
| 3,418,272 | 12/1968 | Pines | 260—45.8 NT |
| 3,288,749 | 11/1966 | Cox | 260—45.9 R |
| 3,297,628 | 1/1967 | Cyba | 260—45.9 R |
| 3,389,115 | 6/1968 | Childers | 260—45.9 R |

DONALD E. CZAJA, Primary Examiner

G. R. MARSHALL, Assistant Examiner

U.S. Cl. X.R.

44—72; 260—45.7 R, 45.7 P, 45.7 S, 45.75 N, 45.8 N, 45.85